United States Patent
Kobayashi (10) Patent No.: US 9,120,456 B2
(45) Date of Patent: Sep. 1, 2015

(54) SIDE AIRBAG, CURTAIN AIRBAG AND BACK WINDOW AIRBAG

(75) Inventor: Isao Kobayashi, Susono (JP)

(73) Assignee: Toyota Jidosha Kabushiki Kaisha, Toyota-shi, Aichi-Ken (JP)

( * ) Notice: Subject to any disclaimer, the term of this patent is extended or adjusted under 35 U.S.C. 154(b) by 0 days.

(21) Appl. No.: 13/390,944

(22) PCT Filed: Mar. 16, 2011

(86) PCT No.: PCT/JP2011/056274
§ 371 (c)(1), (2), (4) Date: Mar. 9, 2012

(87) PCT Pub. No.: WO2012/124082
PCT Pub. Date: Sep. 20, 2012

(65) Prior Publication Data
US 2014/0138938 A1    May 22, 2014

(51) Int. Cl.
*B60R 21/233* (2006.01)
*B60R 21/207* (2006.01)
*B60R 21/231* (2011.01)
*B60R 21/213* (2011.01)
*B60R 21/232* (2011.01)

(52) U.S. Cl.
CPC ......... *B60R 21/23138* (2013.01); *B60R 21/207* (2013.01); *B60R 21/213* (2013.01); *B60R 21/232* (2013.01); *B60R 21/233* (2013.01); *B60R 2021/23107* (2013.01); *B60R 2021/23146* (2013.01); *B60R 2021/23332* (2013.01)

(58) Field of Classification Search
CPC ............ B60R 21/233; B60R 21/23138; B60R 21/231; B60R 2021/23332; B60R 2021/23107; B60R 2021/23146
USPC ................................................ 280/729, 730.2
See application file for complete search history.

(56) References Cited

U.S. PATENT DOCUMENTS

| | | | |
|---|---|---|---|
| 7,681,907 B2 * | 3/2010 | Svenbrant et al. | 280/728.2 |
| 7,819,419 B2 * | 10/2010 | Hayashi et al. | 280/730.1 |
| 2002/0117839 A1 | 8/2002 | Breyvogel et al. | |
| 2003/0168836 A1 | 9/2003 | Sato et al. | |
| 2006/0071458 A1 * | 4/2006 | Sendelbach et al. | 280/729 |
| 2007/0170707 A1 | 7/2007 | Sato et al. | |

FOREIGN PATENT DOCUMENTS

| | | |
|---|---|---|
| CN | 1373721 | 10/2002 |
| CN | 1443674 | 9/2003 |

(Continued)

*Primary Examiner* — Keith Frisby
(74) *Attorney, Agent, or Firm* — Finnegan, Henderson, Farabow, Garrett & Dunner, LLP (57) ABSTRACT

An object of the invention is to provide an airbag that can be efficiently stored according to a storage space. The invention is a side airbag 1 stored in the backrest portion SA of a vehicle seat S, having a first airbag 3 which is inflated in a circular shape by gas supplied by an inflator 2 provided in the backrest portion SA when seen from the side of the backrest portion SA; a second airbag 4 provided so as to be located in the first airbag 3 in an inflated state; and a communicating path 5 that communicates the first airbag 3 and the second airbag 4 on the side of the backrest portion of the second airbag when seen from the side of the backrest portion, in which the second airbag 4 has a vertical width T2 set to be larger than the vertical width T3 of the communication path 5, and has at least the top portion 4b, the bottom portion 4c, and the front portion 4d separated from the first airbag 3 when seen from the side of the backrest portion SA.

2 Claims, 7 Drawing Sheets

(56) References Cited

FOREIGN PATENT DOCUMENTS

| | | | |
|---|---|---|---|
| DE | 10323129 A1 * | 12/2004 | ............ B60R 21/24 |
| JP | 2003-261000 | 9/2003 | |
| JP | 2005112165 A * | 4/2005 | ............ B60R 21/22 |
| JP | 2008-30620 | 2/2008 | |
| JP | 2008201175 A * | 9/2008 | |
| JP | 2009-51446 | 3/2009 | |
| JP | 2010-036870 | 2/2010 | |
| WO | WO 2010133280 A1 * | 11/2010 | |

\* cited by examiner

PRIOR ART

Fig.7

PRIOR ART

SIDE AIRBAG, CURTAIN AIRBAG AND BACK WINDOW AIRBAG

TECHNICAL FIELD

The present invention relates to a side airbag, a curtain airbag, and a back window airbag.

BACKGROUND ART

Figure 6:
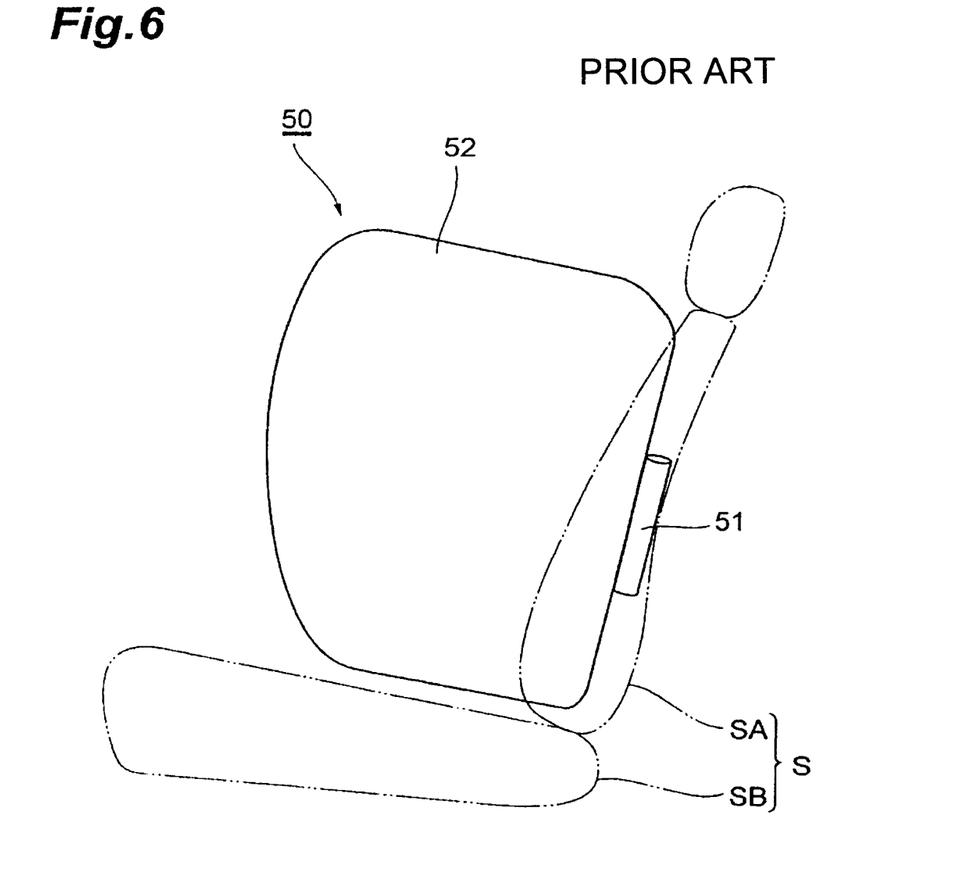
FIG. 6 is a side view showing a side airbag of the related art.

In the past, for example, a side airbag having a shape shown in FIG. 6 was known as a side airbag stored in a seat in a vehicle. The side airbag 50 of the related art, which is shown in FIG. 6, has an airbag portion 52 for protecting a passenger from a side impact in an emergency case and an inflator 51 that supplies gas to inflate the airbag portion 52.

In addition, a shape having a plurality of air bag portions was known as the shape of an airbag of the related art. For example, Japanese Unexamined Patent Application Publication No. 2008-30620 describes a side airbag having two airbag portions and an inflator that supplies air to the two airbag portions at the top and bottom.

CITATION LIST

Patent Literature

[Patent Literature 1] Japanese Unexamined Patent Application Publication No. 2008-30620

SUMMARY OF INVENTION

Technical Problem

Figure 7:
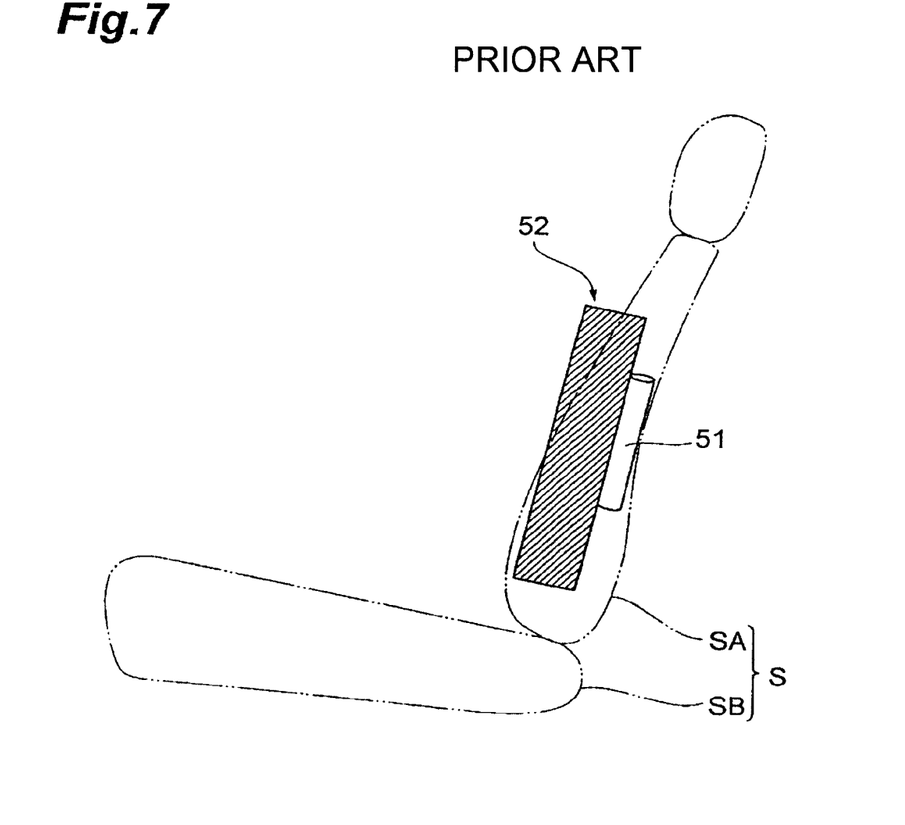
FIG. 7 is a side view showing a storage state of the side airbag of the related art.

In recent years, there has been demand for a side airbag having a wide protection range so as to protect the shoulder to waist of a passenger in order to further improve the passenger protection performance. For example, the side airbag 50 of the related art, which is shown in FIG. 6, has the airbag portion 52 large enough to protect the shoulder to waist of a passenger. However, as shown in FIG. 7, if the size of the airbag portion 52 is simply increased, there are problems in that a necessary space is also increased, and the airbag portion cannot be stored in the backrest portion of a seat.

Therefore, an object of the invention is to provide a side airbag, a curtain airbag, and a back window airbag which can be accordingly and efficiently stored in a storage space.

Solution to Problem

In order to solve the problem, the invention is a side airbag stored in the backrest portion of a seat, having a first airbag which is inflated in a circular shape by gas supplied by an inflator provided in the backrest portion when seen from the side of the backrest portion; a second airbag provided so as to be located in the first airbag in an inflated state; and a communicating path that communicates the first airbag and the second airbag on the backrest portion side of the second airbag when seen from the side of the backrest portion, in which the second airbag has a vertical width set to be larger than the vertical width of the communication path, and at least the top portion, the bottom portion, and the front portion are separated from the first airbag when seen from the side of the backrest portion.

According to the side airbag of the invention, since at least the top portion, the bottom portion, and the front portion of the second airbag are separated from the first airbag in an inflated state, and the vertical width of the second airbag is set to be larger than the vertical width of the communicating path, the first airbag and the second airbag can be separately folded and stored in the backrest portion of the seat. According to the side airbag, since the storage place of the second airbag can be changed by the location of the communicating path, the storage place of the second airbag is specified according to the storage space in the backrest portion of the seat, and therefore the side airbag can be efficiently stored.

The side airbag according to the invention is, in a inflated state, preferably located on the seat's seating portion side or on the seat's headrest side of the central portion of the second airbag in the extension direction of the backrest portion when seen from the side of the backrest portion.

According to the side airbag of the invention, since there are frequent cases in which the storage space in the backrest portion is located closer to the seating portion side or the headrest side, the second airbag can be stored in a spacious location in the storage space by providing the communicating path on the seating portion side or the headrest side, and the side airbag can be efficiently stored.

The invention is a curtain airbag that is stored in the vehicle interior top side portion of a vehicle and inflates along a window of the vehicle, having a first airbag which is inflated in a circular shape by gas supplied by an inflator provided in a vehicle interior top side portion when seen from the side of the vehicle; a second airbag provided so as to be located in the first airbag in an inflated state; and a communicating path that communicates the first airbag and the second airbag on the top side of the vehicle, in which the second airbag has a horizontal width set to be larger than the horizontal width of the communication path when seen from the side of the vehicle, and at least the front portion, the rear portion, and the bottom portion are separated from the first airbag when seen from the side of the vehicle.

According to the curtain airbag of the invention, since at least the front portion, the rear portion, and the bottom portion of the second airbag are separated from the first airbag in an inflated state, and the horizontal width of the second airbag is set to be larger than the horizontal width of the communication path when seen from the side of the vehicle, the first airbag and the second airbag can be separately folded and stored in the top side portion of the vehicle interior. According to the curtain airbag, since the storage place of the second airbag can be changed by the location of the communicating path, the storage place of the second airbag is specified according to the storage space in the top side portion of the vehicle interior, and therefore the curtain airbag can be efficiently stored.

The invention is a back window airbag that is stored in the vehicle interior top rear portion of a vehicle and inflates along the back window of the vehicle when a collision is detected, having a first airbag which is inflated in a circular shape by gas supplied by an inflator provided in a vehicle interior top rear portion when seen from the front face of the vehicle; a second airbag provided so as to be located in the first airbag in an inflated state; and a communicating path that communicates the first airbag and the second airbag on the top side of the vehicle, in which the second airbag has a horizontal width set to be larger than the horizontal width of the communication path when seen from the front face of the vehicle, and has at least both side portions and the bottom portion separated from the first airbag when seen from the front face of the vehicle.

According to the back window airbag of the invention, since at least both side portions and the bottom portion of the second airbag are separated from the first airbag in an inflated state, and the horizontal width of the second airbag is set to be larger than the horizontal width of the communication path when seen from the front face of the vehicle, the first airbag and the second airbag can be separately folded and stored in the top rear portion of the vehicle interior. According to the back window airbag, since the storage place of the second airbag can be changed by the location of the communicating path, the storage place of the second airbag is specified according to the storage space in the top rear portion of the vehicle interior, and therefore the back window airbag can be efficiently stored.

Advantageous Effects of Invention

According to the invention, it is possible to provide a side airbag, a curtain airbag, and a back window airbag which can be accordingly and efficiently stored in a storage space.

DESCRIPTION OF EMBODIMENTS

Hereinafter, a preferred embodiment of the invention will be described in detail with reference to the drawings.

Figure 1:
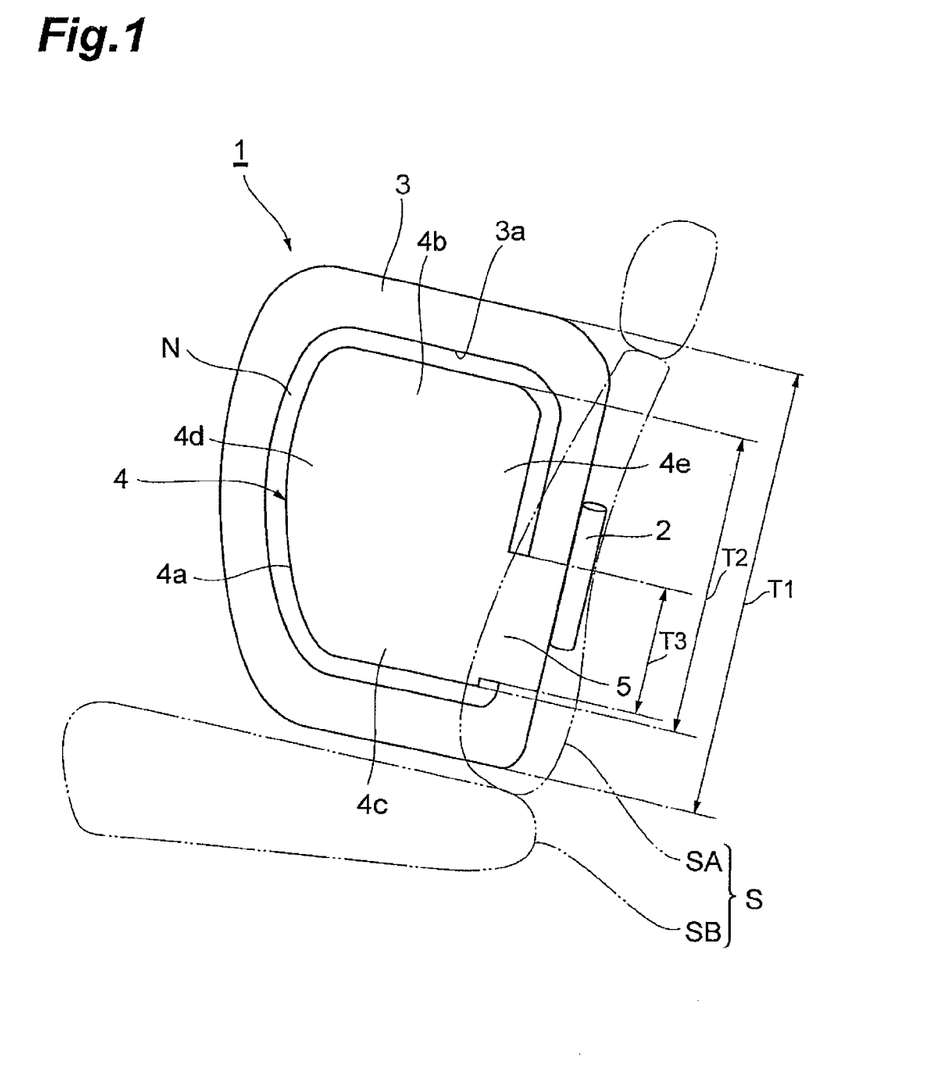
FIG. 1 is a side view showing an embodiment of the side airbag of the invention.
Figure 2:
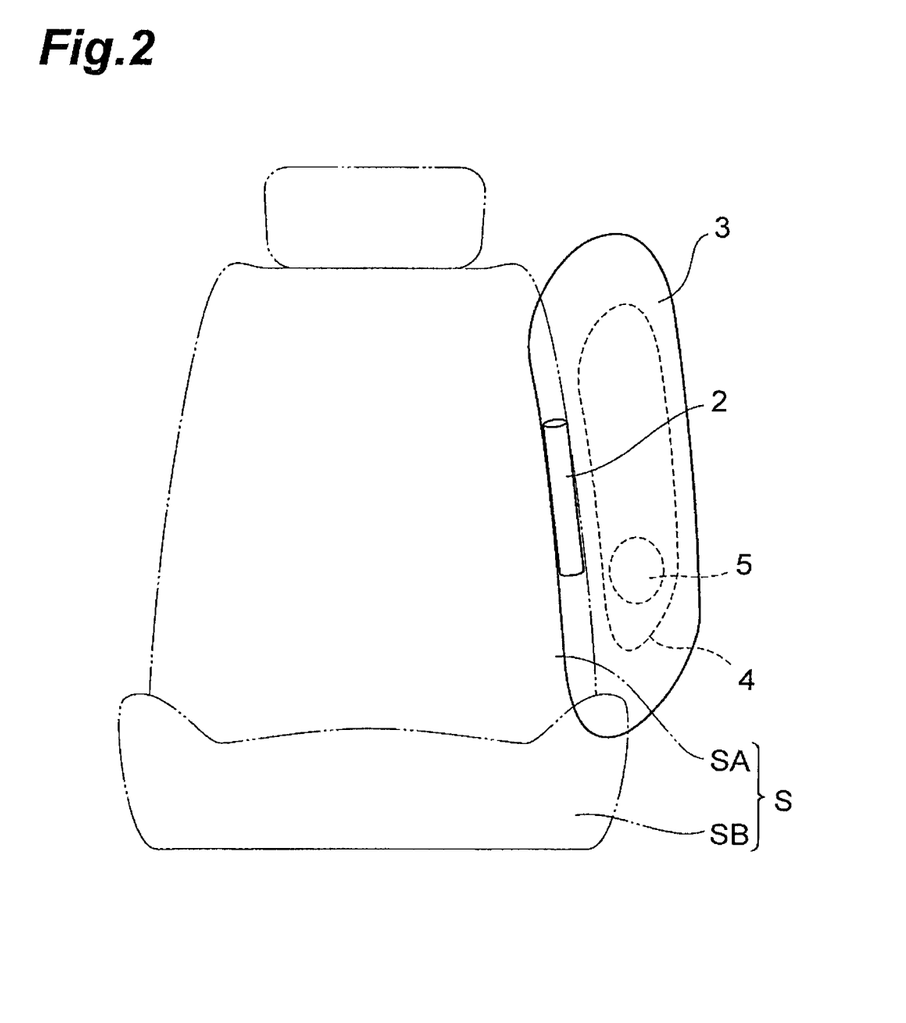
FIG. 2 is a front view of the side airbag in FIG. 1.

As shown in FIGS. 1 and 2, a side airbag 1 according to the present embodiment is a side airbag that is inflated when an impact occurs on a vehicle so as to prevent a passenger from the impact from the side of the vehicle. The side airbag 1 is normally stored in a backrest portion SA of a vehicle seat S. The side airbag 1 is inflated toward the front of the vehicle seat S by gas supplied by an inflator 2 provided in the backrest portion SA. The side airbag 1 has a size large enough to sufficiently cover the shoulder to waist of the passenger sitting on a seating portion SB of the vehicle seat S in an inflated state.

Hereinafter, the side airbag 1 in an inflated state will be described.

As shown in FIGS. 1 and 2, the side airbag 1 has a dual airbag structure composed of a first airbag 3 outside and a second airbag 4 inside. The first airbag 3 in an inflated state forms a circular shape when seen from the side of the backrest portion SA shown in FIG. 1, and has the second airbag 4 located inside. The first airbag 3 and the second airbag 4 are connected with each other through a communicating path 5. The right and left side faces of the second airbag 4 are exposed outside, and the first airbag 3 covers the front and rear directions and the top and bottom directions of the second airbag 4.

The first airbag 3 in an inflated state does not come into contact with the second airbag 4, and an inner face 3a of the first airbag 3 and an outer face 4a of the second airbag 4 are separated from each other. A separating space N that separates the first airbag 3 and the second airbag 4 is formed between the inner face 3a of the first airbag 3 and the outer face 4a of the second airbag 4. The separating space N is formed so as to penetrate the side airbag 1 at the side of the backrest portion SA.

In addition, in the side airbag 1, the second airbag 4 is formed to be smaller than the first side airbag 3 when seen from the front direction of the backrest portion SA shown in FIG. 2. The first airbag 3 is provided to have a vertical width T1 shown in FIG. 1 larger than a vertical width T2 of the second airbag 4.

The second airbag 4 is divided into 4 portions of a top portion 4b, a bottom portion 4c, a front portion 4d, and a rear portion 4e when seen from the side of the backrest SA. The top portion 4b, the bottom portion 4c, and the front portion 4d in the second airbag 4 are fully separated from the first airbag 3 in an inflated state.

In addition, the vertical width T2 of the second airbag 4 shown in FIG. 1 is provided to be larger than a vertical width T3 of the communicating path 5. Thereby, some of the rear portion 4e of the second airbag 4 is also separated from the first airbag 3. Specifically, the part of the rear portion 4e which is not in contact with the communicating path 5 is separated from the first airbag 3.

The first airbag 3 and the second airbag 4 are communicated through the communicating path 5. The inflator 2 is directly connected with the inside of the first airbag 3. Gas supplied by the inflator 2 is supplied to the inside of the second airbag 4 from the inside of the first airbag 3 through the communicating path 5.

The communicating path 5 is formed on the inflator 2 side of the second airbag 4 when seen from the side of the backrest SA shown in FIG. 1. In addition, the communicating path 5 is formed on the seating portion SB side of the second airbag 4. The communicating path 5 is located on the seating portion SB side of the central location of the second airbag 4 in an inflated state in the extension direction (approximately the vertical direction of the seat position in FIG. 1) of the backrest portion SA when seen from the side of the backrest portion SA. Hereinafter, the extension direction of the backrest portion SA when seen from the side of the backrest portion SA is simply called the extension direction of the backrest portion SA.

In addition, the communicating path 5 is formed into a size in consideration of the storage properties of the side airbag 1. The communicating path 5 in an inflated state is formed to be smaller than the size of the second airbag 4 when seen from the front direction of the backrest portion SA shown in FIG. 2. The communicating path 5 is formed so as to be overlapped with the second airbag 4 in an inflated state when seen from the front direction of the backrest portion SA shown in FIG. 2.

Next, the sequence of storing the side airbag 1 in an uninflated state in the backrest portion SA will be described.

Figure 3:
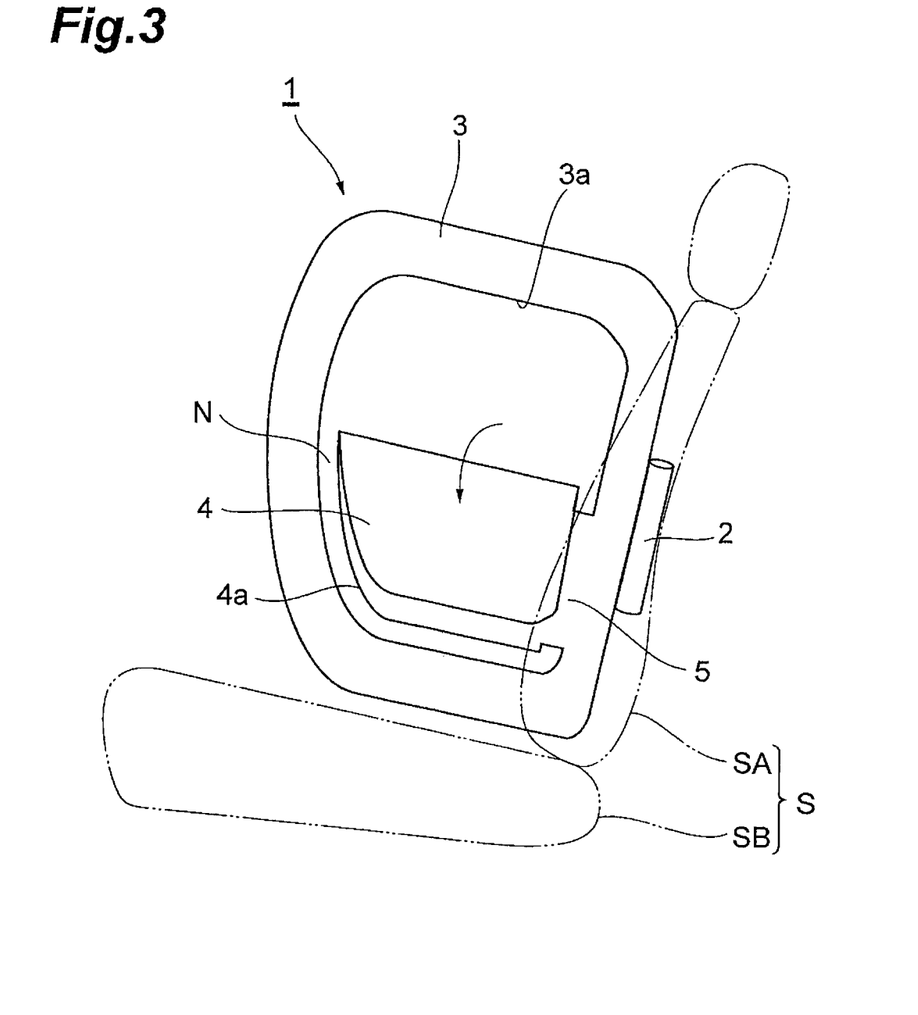
FIG. 3 is a side view showing a state in which the second airbag is folded once.

FIG. 3 is a side view showing a state in which the second airbag 4 in the side airbag 1 of FIG. 1 is folded once. As shown in FIG. 3, since the second airbag 4 has a configuration of being separated from the first airbag 3, the second airbag 4 can be folded separately from the first airbag 3. In FIG. 3, the second airbag 4 is half folded toward the seating portion SB.

Figure 4:
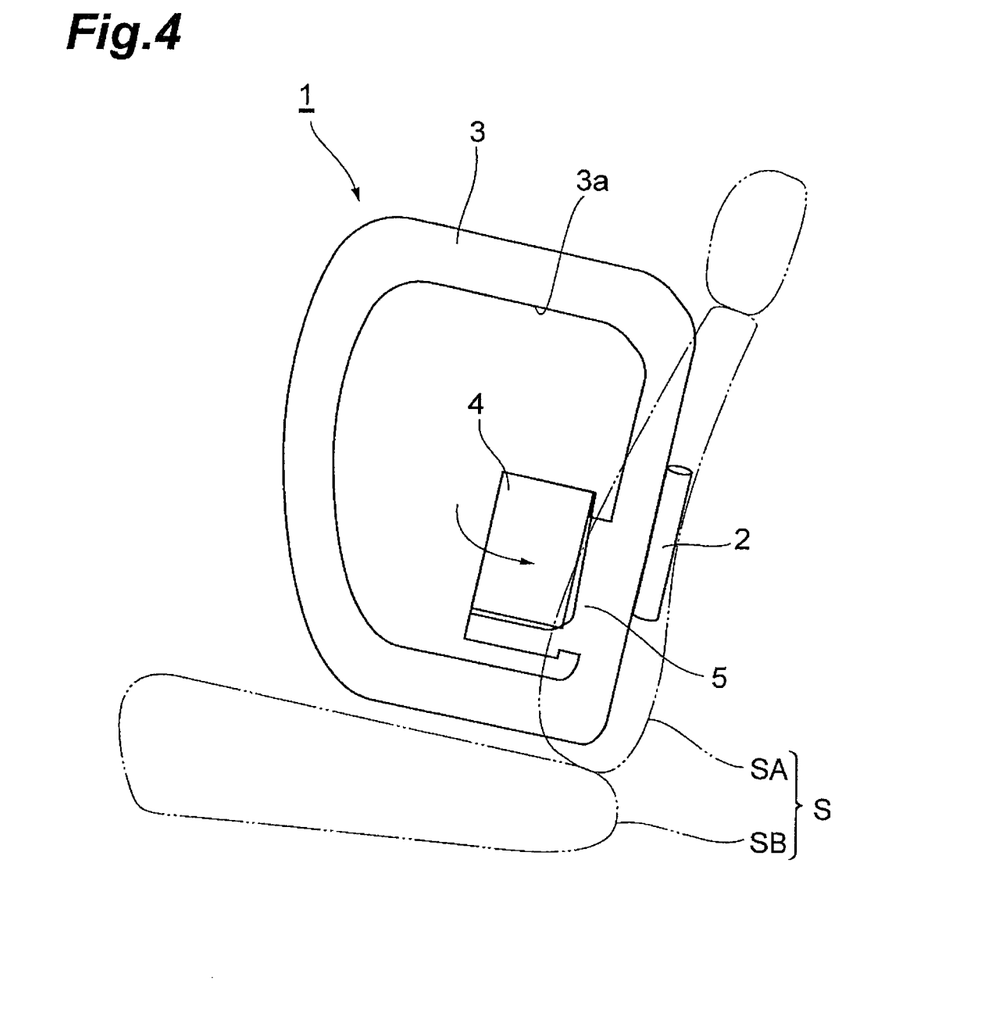
FIG. 4 is a side view showing a state in which the second airbag is folded twice.

FIG. 4 is a side view showing a state in which the second airbag 4 is folded twice. In FIG. 4, the second airbag 4 in the state of FIG. 3 is half folded toward the backrest portion SA. In other words, in FIG. 4, the second airbag 4 in the state of FIG. 1 is in a state of being folded four times.

Figure 5:
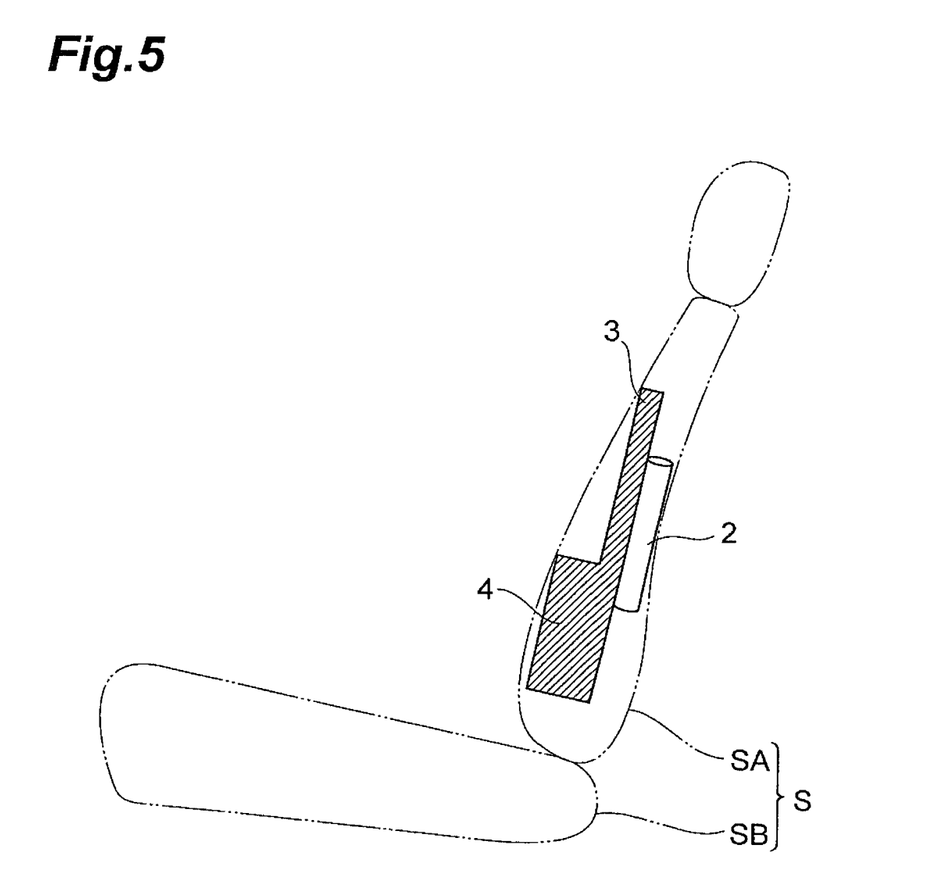
FIG. 5 is a side view showing a state in which the side airbag is stored in the backrest portion of a seat.

FIG. 5 is a side view showing a state in which the side airbag 1 is stored in the backrest portion SA. In FIG. 5, the first airbag 3 is also stored in the backrest portion SA. The second airbag 4 is further folded from the state of FIG. 4 using the communicating path 5 as a pivot point, and stored in the state of FIG. 5. The second airbag 4 is stored on the seating portion SB side of the backrest portion SA correspondingly to the location of the communicating path 5.

According to the side airbag 1 as described above, since the portion from the top portion 4b, the bottom portion 4c, the front portion 4d, and the rear portion 4e of the second airbag 4 when seen from the side of the backrest portion SA, which are not in contact with the communicating path 5, are separated from the first airbag 3, the first airbag 3 and the second airbag 4 can be separately folded and stored in the backrest portion SA. According to the side airbag 1, since the storage place of the second airbag 4 can be changed by the disposal location of the communicating path 5, the storage place of the second airbag 4 is specified according to the storage space of the backrest portion SA, whereby the side airbag 1 can be efficiently stored.

In addition, since the communicating path 5 is located on the seating portion SB side of the central location of the second airbag 4 in the extension direction of the backrest portion SA in an inflated state in the side airbag 1, the backrest portion SA of the seat is, in general, sufficiently large at the seating portion SB side that supports loads, and a storage space can be easily provided, whereby the second airbag 4 can be stored in the seating portion SB side of the backrest SA by providing the communicating path 5 on the seating portion SB side, and the side airbag 1 can be efficiently stored.

The invention is not limited to the above embodiment.

The invention can be applied to a curtain airbag or a back window airbag in addition to the above side airbag.

In addition, in the side airbag 1, the communicating path 5 may also be located on a vehicle seat S' headrest side of the central location of the second airbag 4 in the extension direction of the backrest portion SA in an inflated state. According to this configuration, the second airbag 4 can be stored in a location having a spacious storage space according to the backrest portion SA for which the storage space is closer to the headrest side, and the side airbag 1 can be efficiently stored.

In addition, the sizes or shapes of the first airbag 3 and the second airbag 4 are not necessarily limited to the above. Similarly, the size or shape of the communicating path 5 is also not limited to the above. The communicating path 5 may also be located on the headrest side instead of the seating portion side when a storage space can be secured on the headrest side of the backrest portion. In addition, the seat in which the side airbag 1 is stored is not limited to vehicle seats.

INDUSTRIAL APPLICABILITY

The invention can be used for a side airbag, a curtain airbag, and a back window airbag.

REFERENCE SIGNS LIST

1 . . . SIDE AIRBAG
2 . . . INFLATOR
3 . . . FIRST AIRBAG
3a . . . INNER FACE
4 . . . SECOND AIRBAG
4a . . . OUTER FACE
4b . . . TOP PORTION
4c . . . BOTTOM PORTION
4d . . . FRONT PORTION
4e . . . REAR PORTION
5 . . . COMMUNICATING PATH
50 . . . SIDE AIRBAG
52 . . . AIRBAG PORTION
51 . . . INFLATOR
N . . . SEPARATING SPACE
S . . . VEHICLE SEAT
SA . . . BACKREST PORTION
SB . . . SEATING PORTION
T1 . . . VERTICAL WIDTH OF THE FIRST AIRBAG
T2 . . . VERTICAL WIDTH OF THE SECOND AIRBAG
T3 . . . VERTICAL WIDTH OF THE COMMUNICATING PATH.

The invention claimed is:

1. A side airbag stored in a backrest portion of a seat, comprising:
   a first airbag which is inflated in a circular shape by gas supplied by an inflator provided in the backrest portion when seen from the side of the backrest portion;
   a second airbag provided so as to be located in the first airbag in an inflated state; and
   a communicating path that communicates the first airbag and the second airbag on the backrest portion side of the second airbag when seen from the side of the backrest portion,
   wherein the second airbag has a vertical width set to be larger than the vertical width of the communication path, and has at least a top portion, a bottom portion, and a front portion separated from the first airbag by an air gap when seen from the side of the backrest portion, such that the second airbag has a configuration permitting the second airbag to be folded separately from the first airbag in a deflated state.

2. The side airbag according to claim 1,
   wherein the communicating path is located on the seat's seating portion side or the seat's headrest side of the central location of the second airbag in the extension direction of the backrest portion when seen from the side of the backrest portion in an inflated state.

* * * * *